Jan. 16, 1973 W. A. GURNEY 3,711,259

SAFETY DEVICE

Filed March 10, 1970 3 Sheets-Sheet 1

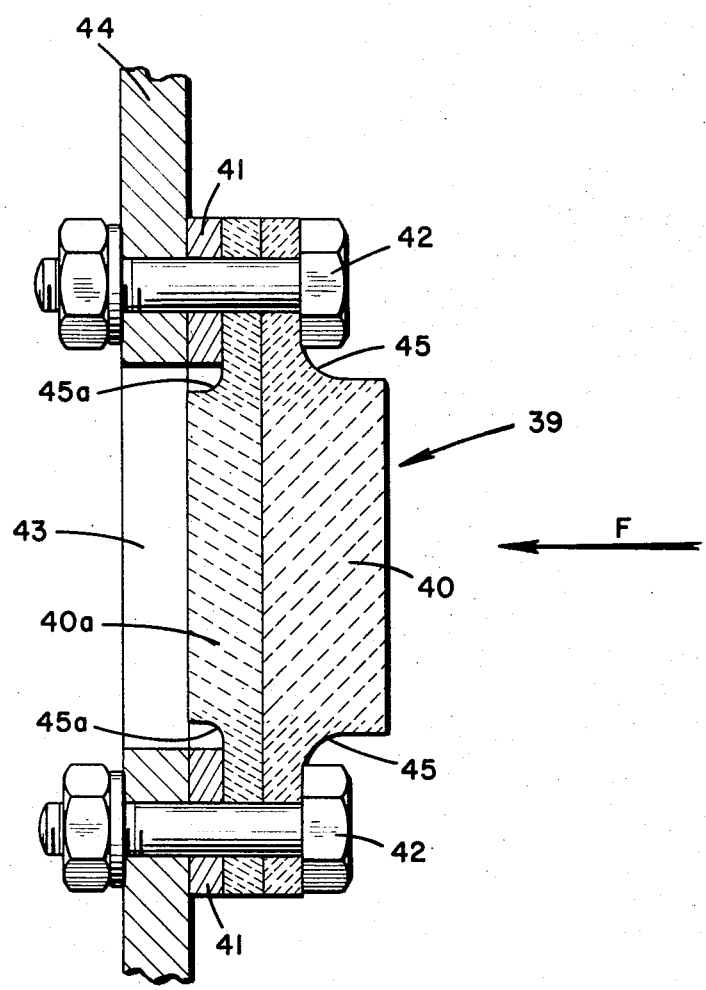

United States Patent Office 3,711,259
Patented Jan. 16, 1973

3,711,259
SAFETY DEVICE
William A. Gurney, Birmingham, England, assignor to Dunlop Holdings Limited, London, England
Filed Mar. 10, 1970, Ser. No. 18,231
Claims priority, application Great Britain, Mar. 19, 1969, 14,406/69
Int. Cl. F17d 3/00; F23d 13/46
U.S. Cl. 48—192
13 Claims

ABSTRACT OF THE DISCLOSURE

A flame arrester which comprises closure means for allowing gas to pass therethrough while preventing passage of a flame and retaining means for retaining the closure means in position in or adjacent an aperture or passage and in which the closure means comprises a porous metal and/or ceramic material in the form of a three-dimensional network arranged to define a plurality of cellular spaces which intercommunicate with one another and the retaining means comprises a compressed portion of the three-dimensional network of the closure means. Preferably the closure member is a reticulated polyurethane foam which has been electroplated with nickel or iron.

This invention relates to safety devices and in particular to flame arresters.

According to the present invention a flame arrester comprises closure means for allowing gas to pass therethrough while preventing passage of a flame and retaining means for retaining the closure means in position in or adjacent an aperture or passage and in which the closure means comprises a porous metal and/or ceramic material in the form of a three-dimensional network arranged to define a plurality of cellular spaces which intercommunicate with one another.

Where the flame arresters comprise a porous metal, the three-dimensional network may be produced by spraying, dipping or electrodeposition of the metal on a porous material. The porous material may be in the form of an agglomerate of fibres such as a felted material, or a sponge-like or foam material, such as natural sponge or a synthetic resinous foam. In general, polyurethane foams are preferred. The porous material may remain in the metal or it may be removed, e.g. by heating to melt or "ash out" the material.

Where a high degree of porosity is required the foam may be reticulated foam, i.e. a foam in which the organic phase is a three-dimensional network with no substantial wall portions defining the cells. Such reticulated foams may be produced by removing the relatively thin cell walls from a foam, e.g. by chemical means such as aqueous sodium hydroxide in the case of polyurethane foams.

When the metal is to be electrodeposited it is, of course, necessary either to use a porous material which is electrically conducting or to render the material conducting by means of a conducting surface layer. Non-conductive materials may be made self-conducting by means of an additive such as graphite or a powdered metal. A conducting surface layer may be applied by coating the material with a curable resinous material incorporating a conductive additive or by chemically depositing a metal thereon, e.g. by the reduction of ammoniacal silver nitrate in situ. In general, where chemical deposition is employed the surface should be treated with one or more sensitising agents such as stannous chloride followed by palladium chloride for silver.

Metals which can be electrodeposited include silver, copper, nickel, chromium and iron. Alloy foams can be produced in some cases by direct plating and in other cases two or more metals may be deposited successively and the alloy formed by heating the resultant structure. Steel foams can be produced by the incorporation of the required amounts of carbon and/or nitrogen. The carbon may be derived from organic material forming the basic foam or added to an electroplating bath.

If desired, the closure member may comprise a chromium network. The porous chromium structure may be produced in a variety of ways but it is preferred to chromise a porous iron or nickel structure.

In one method of producing a porous chromium structure, a porous iron structure is disposed within a container which is subsequently filled with a mixture of powdered chromium and alumina. This is then heated for about 4 hours at 1300° C. in an atmosphere of hydrogen. This treatment effectively chromised the porous iron.

An alternative method of chromising a porous iron structure is to react hydrogen and hydrogen chloride with chromium to form chromium chloride which acts as an active chromium barrier. This is then permitted to react with the metal surface where it releases free chromium which diffuses inwardly to produce a hard, brittle coating which varies in depth from 0.0005 to 0.005. The coating contains from 10 to 30 percent chromium.

A further alternative method is to heat the substrate in chromium carbonyl vapour at a temperature of 450 to 600° C. until the required amount of chromium has been deposited.

If desired, the closure member may comprise or be coated with chromium only at faces which, in use, face the flame front.

The closure member may be a porous ceramic material and may, if desired, be composed entirely of ceramic material or it may be in the form of a coating on a porous metal. In the latter case a vitreous enamel can be applied to a metal network by dipping in a slip or in a fluidised bed of dry material, or by electrophoretic techniques. The structure is then dried and heated to the vitrification temperatures. To produce a structure consisting of porous ceramic material, a non-metallic body is coated with ceramic material by, for example, dipping in a clay slip and subsequently heating.

The resulting metal or ceramic structures can, of course, be heat-treated to give desirable physical properties, such heat-treatments being well-known in the art.

The closure member may comprise a plurality of layers of porous metal or ceramic material. The layers may be bonded together, for example, by means of adhesive or welding or two or more of the layers may be made integral with one another.

Preferably, where a multi-layer construction is used, the porosity of the layer facing the flame front is greater than that remote from the flame front, suitable porosities of the layers are 15 to 60 pores per inch at the flame front and 40 to 100 pores per inch remote from the flame front.

The retaining means for the closure member may be attached to the closure member, or separable therefrom. The retaining means may be attached to the closure member by welding, adhesive or where the closure member is made by electrodeposition of a metal or a porous substrate, the retaining means may be made integral with the closure member by simultaneous plating. If desired, the retaining means may, when the closure member is a porous metal structure, be formed by compressing the porous metal structure. Thus, the marginal portion or part or parts of the marginal portion may be compressed. The foam may be compressed either before, during or after deposition of the metal, where the closure member is made by plating a reticulated foam material.

When the closure member is separable from the retaining means, the retaining means may comprise a hollow member having a flange at one or both ends. Alternatively, where it is desired to secure the flame arrester adjacent to an aperture, the retaining means may be a ring having a flange, in which case the flame arrester may be secured to the wall by securing the retaining means.

The closure member of the present invention may take a variety of forms and may, if desired, be a combination of two or more of the above features. Thus, the closure member may be chromised on the face, facing the flame only, and may also consist of a plurality of layers in which the layers facing the flame front has the largest porosity.

Preferred embodiments of the invention are hereinafter described by way of example only, with reference to the accompanying drawings in which:

FIG. 9 is a cross-sectional view of a double layer flame arrester similar to that shown in FIG. 6.

Figure 1:
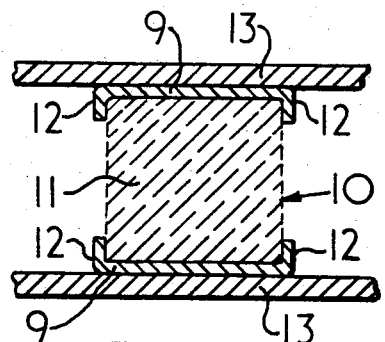
FIG. 1 is a cross-section of a pipe with one form of flame arrester shown in position.

In FIG. 1 a flame arrester 10 which is circular in plan is located in a pipe 13 and comprises a porous closure member 11 formed from a reticulated polyurethane foam electroplated with nickel and which is retained in position by means of flanges 12 located on the end of a tube 9. The flame arrester 10 may be fixed in the pipe 13 by means of friction or by means of an abutment in the pipe 13 which contacts the flanges 12.

Figure 2:
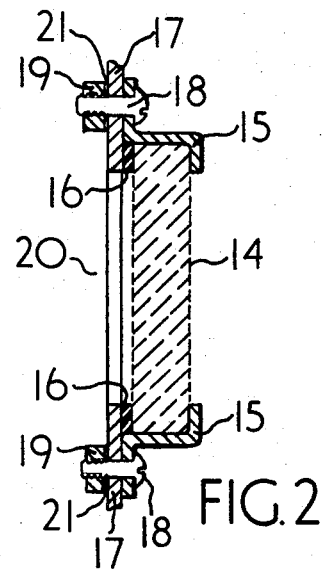
FIG. 2 is a cross-section of an alternative form of flame arrester fixed in position adjacent to an aperture.

In FIG. 2 a flame arrester which is circular in plan is shown in a position adjacent to an aperture 20 in a wall 17 and comprises a porous closure member 14 formed from a reticulated polyurethane foam electroplated with iron and which is retained in position against the wall 17 by means of a flange portion of a metal ring 15. The flame arrester is secured to the wall 17 by means of bolts 18 which pass through the wall 17 and ring 15, and nuts 19 and washers 21. Padding material 16 is inserted between the wall 17 and the closure member 14 so as to provide a seal.

Figure 3:
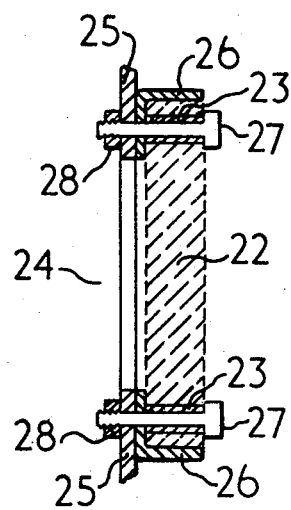
FIG. 3 is a further form of flame arrester shown in position adjacent to an aperture.

In FIG. 3 a flame arrester which is circular in plan is shown in a position adjacent to an aperture 24 in a wall 25 and comprises a porous foam closure member 22 being formed by electroplating reticulated polyurethane foam with nickel and which is retained in position against the wall 25 by means of metal sleeves 23 which pass through the closure member 22. The flame arrester is secured against the wall by means of nuts 28 and bolts 27. A ring 26 is inserted between the wall 25 and the closure member 22 to provide a seal.

Figure 4:
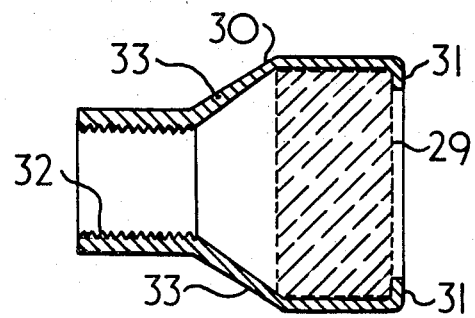
FIG. 4 is a cross-sectional drawing showing a further form of flame arrester for use in position at the end of a pipe.

FIG. 4 shows a flame arrester which is circular in plan and comprises a closure member 29 being formed by electroplating a reticulated polyurethane foam with nickel retained at one end of a hollow member 30 by means of a flange 31. The other end of the hollow member 30 is provided with an internal screw-thread 32 to provide union to a pipe, the two parts of the hollow member 30 being connected by a frusto-conical portion 33.

Figure 5:
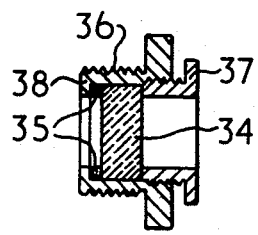
FIG. 5 is a cross-sectional drawing of an alternative form of flame arrester for use in position at the end of the pipe.

FIG. 5 shows a flame arrester which is circular in plan and comprises a porous closure member 34 of a nickel-plated reticulated polyurethane foam positioned inside a hexagon nut 36 which is provided with a flange 38 and a screw-thread for providing union to a pipe. Positioned between the flange 38 and the closure member 34 is a gasket 35. The closure member 34 is retained in the hexagon nut 36 by means of a retaining ring 37.

Figure 6:
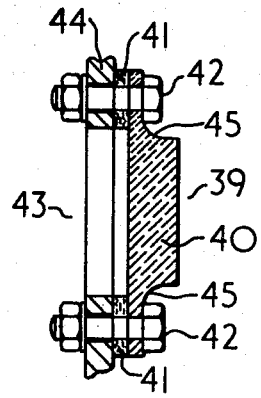
FIG. 6 is a cross-sectional drawing of a further form of flame arrester fixed in position adjacent to an aperture.

In FIG. 6 a flame arrester 39 which is circular in plan is shown in a position adjacent to an aperture 43 in a wall 44 and comprises a porous closure member 40 formed by electroplating a reticulated polyurethane foam with nickel and then chromising, which is retained in position adjacent to the aperture 43 by means of compressed portions 45. Positioned between the wall 44 and the closure member 40 is a circular gasket 41. The flame arrester is secured to the wall 44 by means of nuts and bolts 42, which pass through the compressed portions 45.

Figure 7:
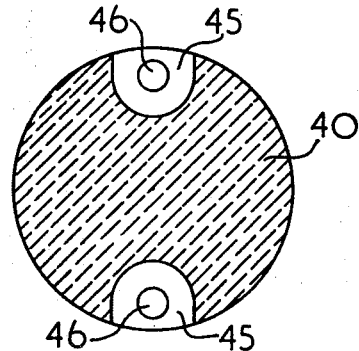
FIG. 7 is a plan view of the flame arrester shown in FIG. 6.

FIG. 7 shows the flame arrester 39 in which the porous closure member 40 has been compressed locally at 45 in order to facilitate attachment to the wall 44 by means of nuts and bolts 42 passing through the holes 46 in the compressed portions 45.

Figure 8:
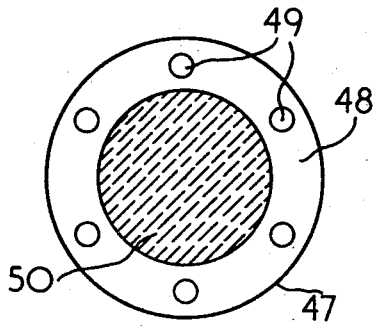
FIG. 8 is a plan view of a flame arrester in which a closure member is integral with a retaining means.

FIG. 8 shows a flame arrester 47 in which the marginal portion of the porous closure member 50, formed by nickel plating reticulated polyurethane foam, has been compressed at 48 to form the retaining means. The marginal portion 48 is provided with holes 49 through which attachment means for securing the flame arrester 47 to a wall are passed.

FIG. 9 shows a cross-sectional view an embodiment of a double layer flame arrester similar to that shown in FIG. 6. In FIG. 9 the flame arrester 39 in aperture 43 comprises double layer porous closure member 40, 40a which is secured to the wall 44 by means of nuts and bolts 42, which pass through compressed portions 45, 45a. This figure also illustrates that the porosity of layer 40 facing the flame front indicated by arrow F is greater than the porosity of layer 40a which is more remote from the flame front.

The following example illustrates the advantage of using flame arresters of the present invention:

EXAMPLE

The flame arrester which was tested comprised two ½ inch thick sheets of a chromised nickel-plated reticulated polyurethane foam having 80 pores per inch cemented together along their side edges cemented into a metal frame which had a 1 inch wide clamping surface for mounting the flame arrester. The flame arrester was bolted on to the 1 inch flange of an explosion vessel with a gasket sealing the joint between the flange and the metal foam. The area of the closure member available for explosion relief was rectangular and measured 8 inches x 6 inches. The internal dimensions of the explosion vessel were 8 inches x 6 inches x 3 inches. This vessel was mounted in a second chamber. For each test the assembled equipment was evacuated and then filled with the required premixed gas mixture at atmospheric pressure. The mixture in the internal vessel was ignited by the high voltage, low power spark. For the majority of the tests the spark source was situated at the wall of the explosion vessel and therefore about 3 inches from the face of the closure member. For the remainder of the tests, as indicated below, ignition was initiated at the middle of the closure member and 1 cm. from its face. Pressure transducers were used to measure the explosion pressure within the internal vessel.

Ten tests were made in both hydrogen/air and acetylene/air gas mixtures. In each series three of the ten tests were made with the ignition source close to the face of the closure member. No ignitions of the external mixture were obtained in these tests.

The peak explosion pressure developed within the internal vessel was about 2 to 3 lb. per sq. in. with both gas mixtures, although this measurement was only approximate since the pressure is only a small fraction of the range of the test equipment.

A few additional tests were made using a reduced pressure relief area. This was achieved by placing a sheet of gasket material between the flame arrester and the internal vessel. A rectangular aperture 2 inches x 2.5 inches was provided at the center of the sheet, giving a relief area of approximately 10 percent of the total available closure member area. Three tests with hydrogen/air, and five with acetylene/air gas mixtures were made with this arrangement. No external ignitions were recorded.

The peak explosion pressure in these tests was about 25 lb. per sq. in. in hydrogen/air, and 30 lb. per sq. in. in the actylene/air mixtures.

There was no visible deterioration of the closure member after the first series of tests, and only slight discoloration after the tests with reduced relief area.

Having now described by invention, what I claim is:

1. A flame arrester comprising closure means for allowing gas to pass therethrough while preventing flame from passing therethrough, said closure means comprising a porous three-dimensional metallic network comprising a reticulated foam, the surfaces of which are coated with a metallic coating, said network having a plurality of cellular spaces which intercommunicate with one another, and retaining means for supporting said closure means, said retaining means integral with said closure means, said retaining means comprising a compressed portion of the metallic network of said closure means.

2. A flame arrester according to claim 1, in which the reticulated foam is reticulated polyurethane foam.

3. A flame arrester according to claim 1, in which the metal is nickel or iron.

4. A flame arrester according to claim 3 in which the closure member is chromised iron or chromised nickel.

5. A flame arrester according to claim 1, in which the closure member comprises a plurality of layers of porous metal.

6. A flame arrester according to claim 5, in which the layers are bonded together.

7. A flame arrester according to claim 5, in which one surface of the closure member is the flame front and the porosity of the layer facing the flame front is greater than the porosity of a layer remote from the flame front.

8. A flame arrester according to claim 7 in which the porosity of the layer facing the flame front is between 15 and 60 pores per inch.

9. A flame arrester according to claim 7 in which the porosity of the layer remote from the flame front is between 40 and 100 pores per inch.

10. The flame arrester of claim 1, wherein said retaining means comprises an annular compressed portion of said metallic network surrounding a porous portion of said metallic network through which gas may flow.

11. The flame arrester of claim 1, wherein said retaining means comprises a plurality of compressed portions of said metallic network.

12. The flame arrester of claim 1, wherein said compressed portion of said metallic network has a hole for attachment of other supporting means therethrough.

13. A flame arrester according to claim 1 wherein the compressed portion has a greater density than a remainder portion of said metallic network which is not so compressed.

References Cited

UNITED STATES PATENTS

| | | | |
|---|---|---|---|
| 3,288,578 | 11/1966 | Witt | 48—192 |
| 3,031,285 | 4/1962 | Hedberg | 48—192 |
| 2,482,457 | 9/1949 | Boedecker | 48—192 |
| 2,447,048 | 8/1948 | Baker | 48—192 |
| 3,549,505 | 12/1970 | Hanusa | 204—20 X |
| 3,367,149 | 2/1968 | Manske | 431—328 |
| 3,079,242 | 2/1963 | Glasgow | 48—192 X |
| 1,215,229 | 2/1917 | Willson. | |
| 2,618,540 | 11/1952 | Teti | 48—192 X |
| 2,333,567 | 11/1943 | Helmore | 48—192 X |

JOSEPH SCOVRONEK, Primary Examiner

U.S. Cl. X.R.

138—42, DIG. 9; 220—88 A; 431—346